A. GOHMANN.
REGENERATIVE GAS PRODUCING OVEN.
APPLICATION FILED JULY 1, 1912.

1,039,270.

Patented Sept. 24, 1912.
7 SHEETS—SHEET 7.

Fig. 8.

Witnesses:
Charles Mathe
H. B. Lumpkin

Inventor
Arthur Gohmann
by John Lotka
Attorney

UNITED STATES PATENT OFFICE.

ARTHUR GOHMANN, OF STETTIN, GERMANY, ASSIGNOR TO STETTINER CHAMOTTE-FABRIK ACTIEN-GESELLSCHAFT VORM. DIDIER, OF STETTIN, GERMANY, A CORPORATION OF GERMANY.

REGENERATIVE GAS-PRODUCING OVEN.

1,039,270.  Specification of Letters Patent.  Patented Sept. 24, 1912.

Application filed July 1, 1912. Serial No. 706,858.

*To all whom it may concern:*

Be it known that I, ARTHUR GOHMANN, a citizen of the Empire of Germany, and resident of Stettin, Germany, have invented certain new and useful Improvements in Regenerative Gas-Producing Ovens, of which the following is a specification.

My invention relates to gas producing ovens in which regenerators are employed for preheating the air, and has for its object to overcome certain difficulties to be pointed out presently.

Regenerators are used quite commonly in connection with coke ovens, but their application to gas-producing ovens and particularly chamber ovens, such as used in gas works, has not been possible hitherto in a practical way. The off-gases of a gas-producing oven are much hotter than those of a coke oven. A regenerative coke oven has reversing valves between the regenerators and the heating flues of the oven. If this arrangement is adopted for, say a chamber oven in which the combustion gases always travel in the same direction through the heating flues, the reversing valves will not be able to stand very long, the high temperature of the off gases or of the air highly heated by said gases. For this reason regenerators have not been used in practice in conjunction with gas-producing ovens, although regenerators are much more efficient and economical in operation than the recuperators usually employed in connection with gas-producing furnaces.

It has been proposed to combine regenerators with chamber ovens producing illuminating gas, by operating the ovens with a periodical reversal of the combustion gases in the heating flues. In this case, of course, reversing valves are not required in the connection of the regenerators with the heating flues, but the reversing valves are placed on the far side of the regenerators, that is to say, on the side opposite to that which is connected with the heating flues. The drawback of this arrangement is that ovens operating with a periodical reversal of the combustion gases in the heating flues, do not produce gas so uniformly and efficiently as is required for a good yield of gas and the production of high-grade coke. Another defect of such chamber ovens operating with a reversal of the combustion gases in the heating flues, is the rapid destruction of certain parts of the oven brickwork which are exposed more than others to the highly heated heating gas.

The object of my invention is to provide a gas-producing oven, and particularly a chamber oven in which the combustion gases always travel in the same direction through the heating flues, in which the objectionable features pointed out above are avoided by causing the off gases, on their way from the heating flues to the regenerators, to pass through recuperators in which they are cooled to a temperature which allows suitable reversing valves to be used without risking their premature destruction. This arrangement is particularly applicable in cases in which gas-producing ovens are heated by means of a heating gas generated at some distance, say in a central gas producer, or in a blast furnace, etc. The highly heated off gases of the gas-producing ovens are brought into heat-exchange relation (in the recuperators) with the heating gas, the latter being thus heated to the ignition temperature required for its combustion. I thus secure the double advantage of properly preheating the heating gas by the off gases of the oven, and of cooling such off gases to a temperature which will permit the practical use of reversing valves at the point where the hot off gases enter the regenerator, or where the highly heated air leaves it.

In the accompanying drawings I have illustrated my invention in connection with a gas-producing oven having inclined chambers, but this is only an example, and my invention may be applied to other types of ovens as well.

Figure 1:
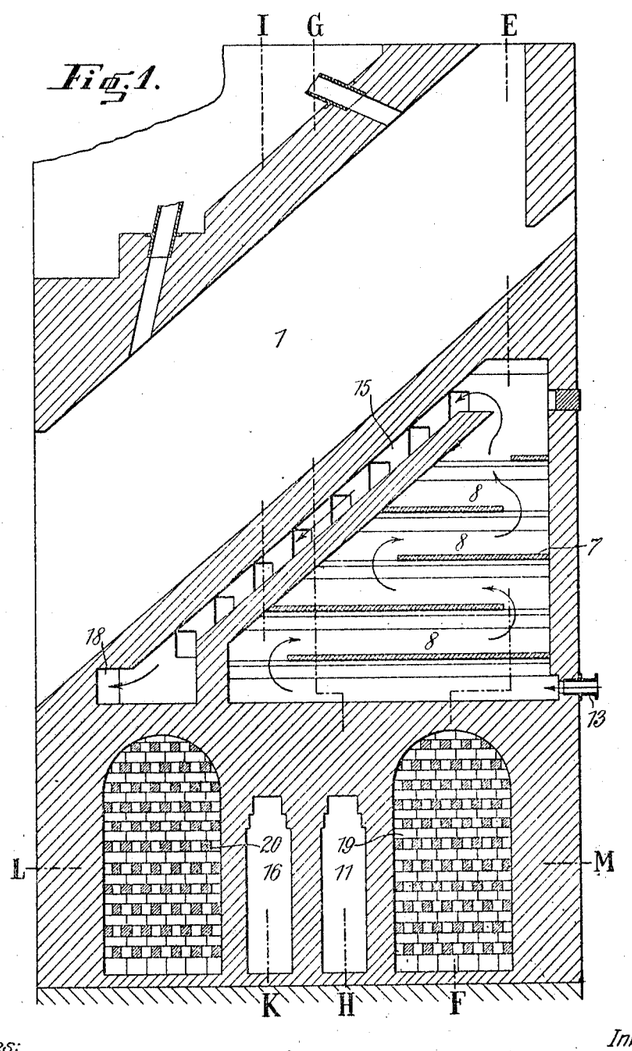
Figure 1 is a vertical section taken on line A—B of Fig. 3.
Figure 3:
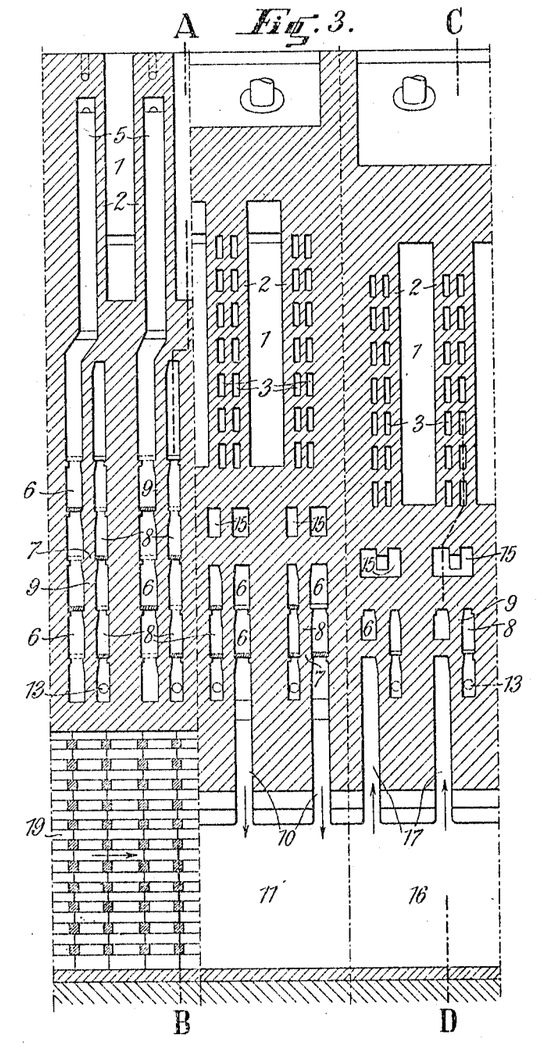
Fig. 3 is a vertical cross section, the left-hand portion of Fig. 3 being taken on line E—F of Fig. 1, the central portion on line G—H of Fig. 1, and the right-hand portion on line I—K of Fig. 1.
Figure 4:
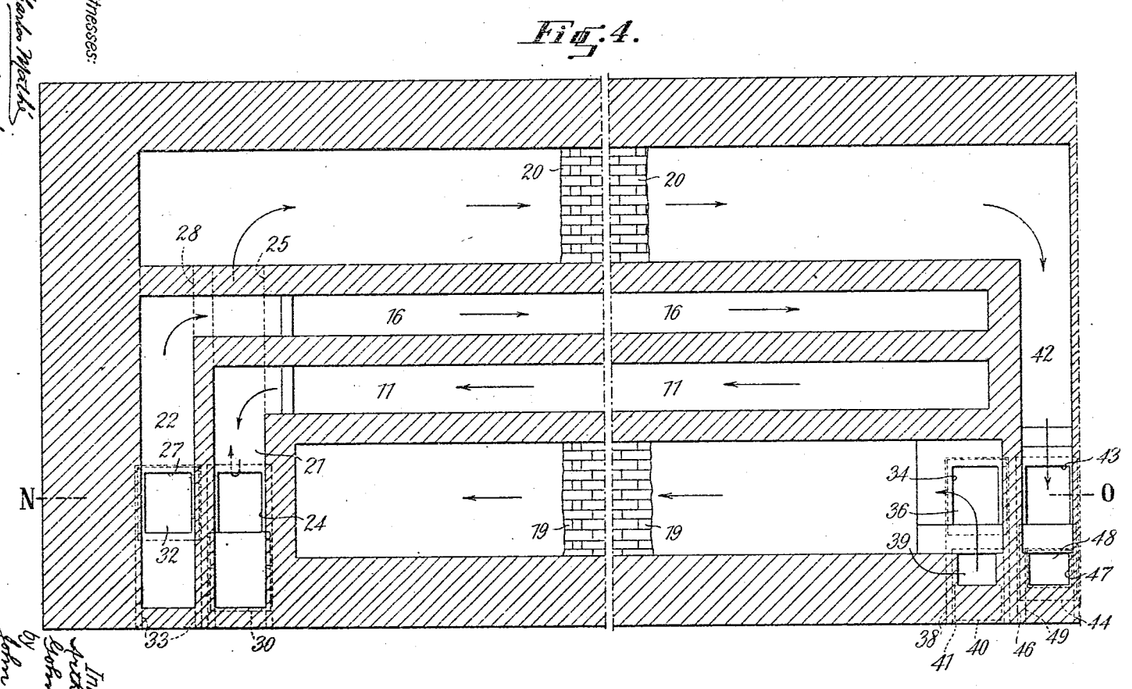
Fig. 4 is a horizontal section on line L—M of Fig. 1, with part of the oven broken away.
Figure 5:
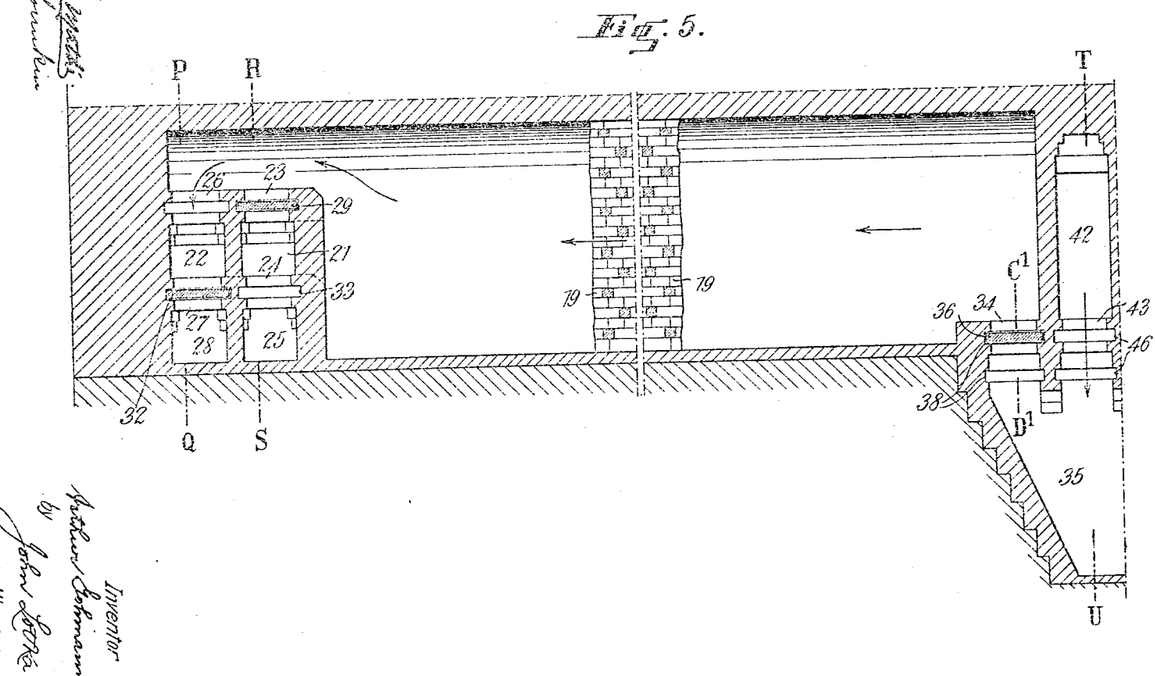
Fig. 5 is a vertical section through the lower portion of the oven, on line N—O of Fig. 4, with parts broken away.
Figure 6:
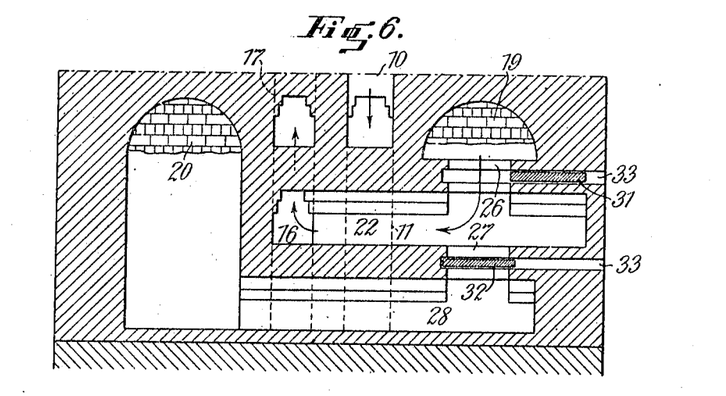
Figs. 6, 7 and 8 are vertical cross sections through the lower portion of the oven, taken respectively on lines P—Q, R—S, and T—U of Fig. 5.

The oven shown in the drawings is provided with a series of inclined oven chambers 1 (Figs. 1 and 3) separated from each other by heating walls or partitions 2 containing the heating flues 3. At their lower ends, all the heating flues 3 of the same heating wall 2 are connected with a vertical distributing channel 4 supplying the heating gas and the air required for the combustion of said gas. Similarly, the upper ends of all the heating flues 3 of the same heating wall 2 are connected with a vertical collecting channel 5 through which the off gases pass out.

Figure 2:
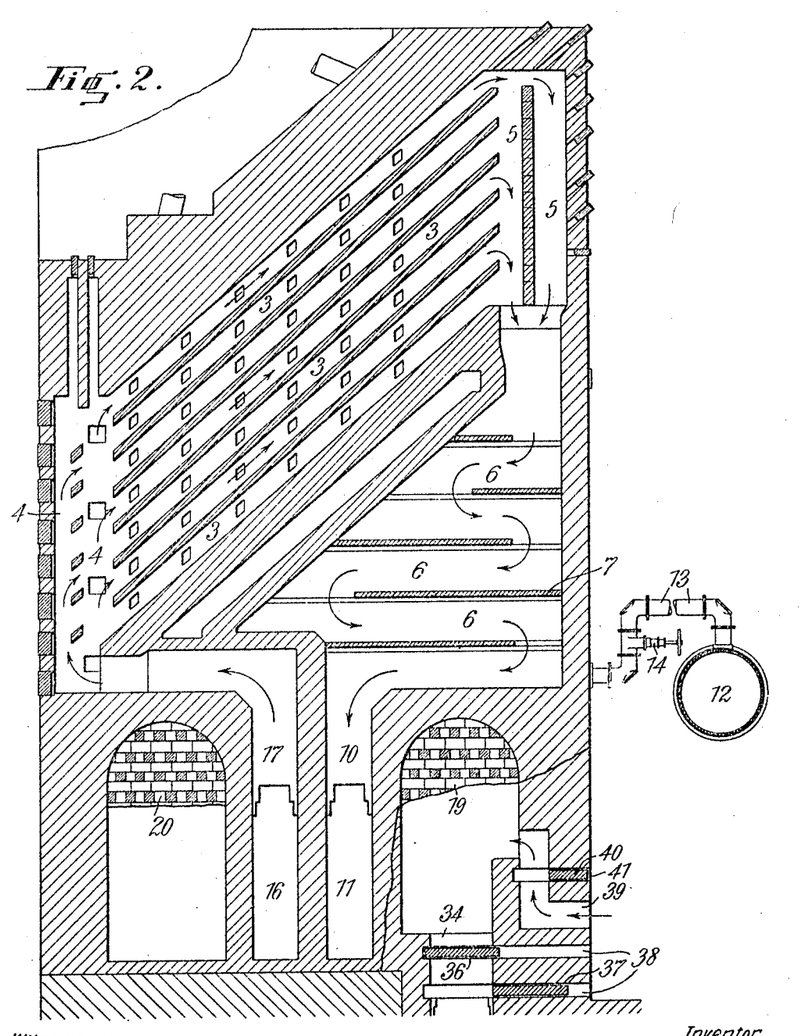
Fig. 2 is a vertical section taken mostly on line C—D of Fig. 3, but partly (at the lower right-hand corner) on line C'—D' of Fig. 5.

From the collecting channels 5 the off gases pass into the channels 6 of the recuperators 7 (Figs. 1, 2 and 3) arranged beneath the oven chamber, these recuperators being of a well-known type, with two groups of channels 6 and 8 respectively, separated from each other by heat exchange partitions 9. The off gases from each channel 5 travel downward through the zig-zag or reverting channels 6 and then pass through a vertical channel 10 into a chest 11 the purpose of which will be explained below.

The heating gas obtained from any suitable source, as from a central gas-producer plant (not shown), is conducted from a main 12 (Fig. 2) to the lower ends of the recuperator channels 8, through individual branch channels 13 provided with regulating valves 14. The main 12 extends along the outer wall of the oven. The heating gas travels upward through the recuperator channels 8 (Fig. 1), that is to say, in the opposite direction to the off gases flowing through the channels 6, and thus reaches the upper ends of inclined channels 15 from the lower ends of which it passes through short lateral channels 18 into the corresponding distributing channels 4.

The air required to support combustion passes from a chest 16 (Figs. 2 and 3) located adjacent to the chest 11, through branch channels 17 connected with the upper part of said chest 16, thus reaching the lower ends of the distributing channels 4.

The two chests 11, 16 are disposed between the regenerators 19, 20 arranged transversely beneath the oven chambers 1 and provided with checkerwork of the well-known character.

Figure 7:
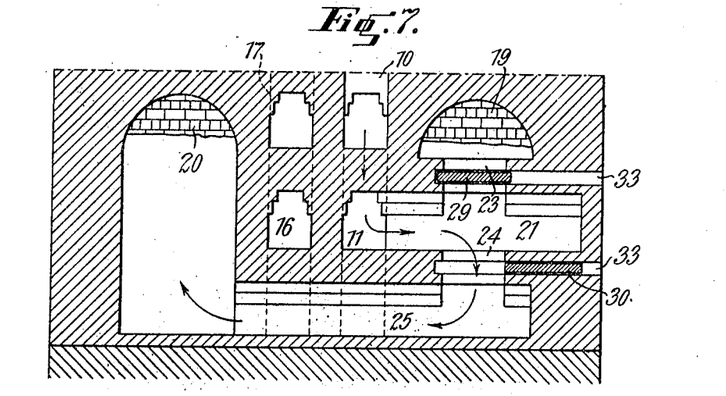

At one end of the oven, the chests 11, 16 are connected with angular or L-shaped channels 21, 22 respectively located side by side (Figs. 4 to 7). The channel 21 has two connections leading to the respective regenerators; a vertical channel 23 leads upward to the regenerator 19, while a similar channel 24 leads downward from the channel 21 to a horizontal channel 25 connected with the regenerator 20 (Fig. 7). In a like manner, a vertical channel 26 leads upward from the channel 22 to the regenerator 19, while a vertical channel 27 leads downward from said channel 22 to a horizontal channel 28 connected with the regenerator 20.

The channels 23, 24, 26, 27 (Figs. 6 and 7) are controlled by horizontal shut-off slides 29, 30, 31, 32 respectively movable in outwardly extending guideways 33 and adjustable from the outside by means of rods or in any other suitable manner.

A vertical channel 34 (Figs. 2 and 5) leads from the regenerator 19 to a smoke flue 35 connected with the chimney. In the channels 34 I provide a shut-off valve 36 and a regulating or throttle valve 37, both movable in horizontal guideways 38 and adapted to be operated from the outside of the oven. An angular channel 39 is adapted to connect the regenerator 19 with the surrounding air, in the open position of the shut-off valve 40 mounted to slide in the horizontal guideway 41. In a similar way, a channel 42 (Figs. 4 and 8) arranged transversely to the regenerator 20, connects the latter with an upright channel 43 the lower end of which communicates with the smoke flue 35. The channel 43 is provided with a shut-off valve 44 and with a regulating valve 45, mounted to slide in horizontal guideways 46 open at their outer ends so that a rod or other suitable implement may be introduced to shift these valves. An angular channel 47 affords a connection between the regenerator 20 and the surrounding air, said channel being provided with a horizontal shut-off slide 48 movable in a guideway 49.

Figure 8:
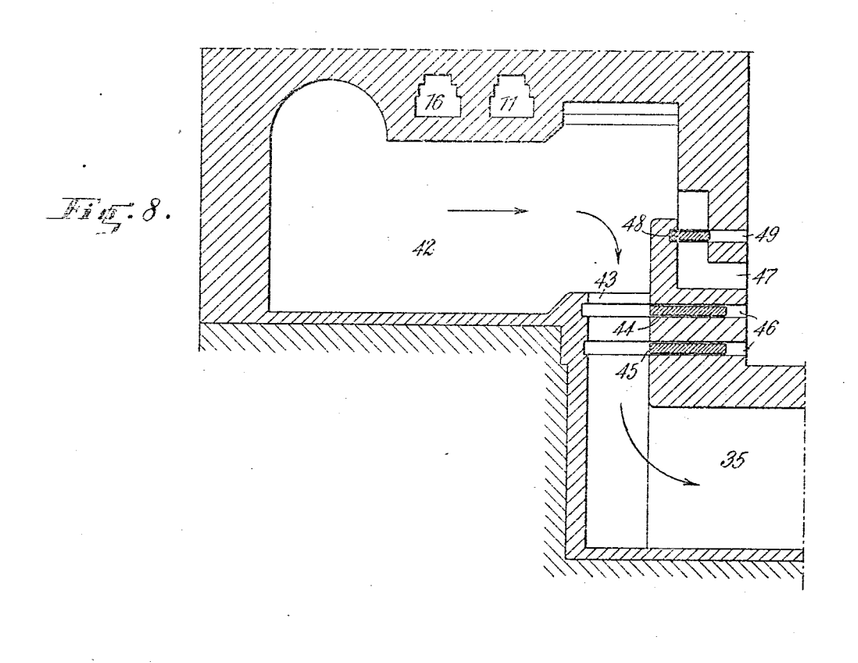

The operation of the chamber oven described above is as follows: The slides 36, 40 (Fig. 2), 44, 48 (Fig. 8), 29, 30 (Fig. 7), and 31, 32 (Fig. 6) being in the position illustrated, the air to support combustion enters the regenerator 19 through the channel 39 (Fig. 2), the checkerwork of said regenerator having absorbed heat during the preceding stage or period of operation. The air heated during its passage through the regenerator 19, passes through the channels 26 (Fig. 6) and 22 into the chest 16. The air then flows through the branch channels 17 (Figs. 2 and 3) and into the corresponding distributing channels 4. The heating gas or fuel is distributed from the main 12 (Fig. 2) to the branch conduits 13, from which it enters the channels or paths 8 of the respective recuperators 7, in which it is heated by the action of the off gases which at the time pass downward through the recuperator channels 6. The heated gas leaving the channels 8 at the top passes into the inclined channels 15, the lateral channels 18 (Fig. 1) and the corresponding distributing channels 4. The mixing and combustion of gas and air begin in the distributing channels 4 and are continued in the heating flues 3. The off gases pass from the heating flues 3 through the vertical collecting channel 5 (Fig. 2) into the channels 6 of the respective recuperators 7. The off gases traveling downward in said channels transmit their heat through the partitions 9 (Fig. 3) to the cool heating gas traveling upward in the channels 8 (Fig. 1), thus heating said gas, as mentioned above. This transfer of heat from the off gases to the heating gas considerably reduces the temperature of the off gases. After passing through the recuperator channels 6 (Fig. 2) the off gases flow through the branch channels 10 (Figs. 2 and 3) into the chest 11. From the latter the off gases travel through the channel 21 (Fig. 4), the upright channel 24 (Fig. 7) and the horizontal channel 25 to the regenerator 20, the checkerwork of which absorbs heat from said gases. After their passage through the regenerator 20 the off gases reach the smoke flue 35 by way of the horizontal channel 42 (Fig. 8) and of the upright channel 43. As soon as the checkerwork of the regenerator 19 has cooled off sufficiently, the air-inlet slide 48 (Fig. 8) and the outlet slide 36 (Fig. 2) are opened, and the air-inlet slide 40 (Fig. 2) and the outlet slide 44 (Fig. 8) are closed. Furthermore, the shut-off slides 29, 30, 31, 32 (Figs. 6 and 7) controlling the connection of the chests 11, 16 with the regenerators 19, 20, are reversed, that is to say, the slides 30, 31 are closed and the slides 29, 32 are opened. With the slides in this new position, air will enter the oven through the inlet channel 47 (Fig. 8) passing through the regenerator 20 to become heated therein and then to the chest 16, while the off gases travel from the chest 11 through the regenerator 19 to the smoke flue 35 (Fig. 8).

It will be observed that the off gases travel through the chest 11 in the same direction during both periods of operation, and similarly, notwithstanding the periodical reversal of certain connections, the air always travels in the same direction through the chest 16.

As above described, the off gases during their passage through the recuperators 7 (Fig. 2) transfer heat to the heating gas which is cool when it enters the oven; the temperature of the off gases is thus considerably reduced, so that they reach the regenerators 19, 20 in a materially cooled condition. Owing to this arrangement, there is no danger of injury to the controlling or reversing valves 29, 30, 31, 32 (Figs. 6 and 7) by excessive heat of the off gases.

Various modifications may be made without departing from the nature of my invention as set forth in the appended claims.

I claim:

1. In a regenerative oven, heating flues, regenerators, connections from the regenerators to the inlets and to the outlets of the heating flues, means for reversing said connections, and a cooling device interposed in the connection between the flue outlets and the reversing means.

2. In a regenerative oven, heating flues, regenerators, reversing means for connecting the regenerators alternately with the inlets and with the outlets of the heating flues, and a cooling device interposed in the path of the off gases from the flue outlets to the reversing means.

3. In a regenerative oven, heating flues, air-heating regenerators, reversing means for connecting the regenerators alternately with the inlets and with the outlets of the heating flues, and a recuperator having a path through which the off gases travel on their way from the flue outlets to the reversing means, and another path through which the fuel travels on its way to the heating flues.

4. In a regenerative oven, heating flues, regenerators, means for reversing the connection of the regenerators with the heating flues, and a cooling device interposed in the path of the off gases from the flues to the reversing means.

5. In a regenerative oven, heating flues, air-heating regenerators, means for reversing the connection of the regenerators with the heating flues, and a recuperator having a path through which the off gases travel on their way from the heating flues to the reversing means, and another path through which the fuel travels on its way to the heating flues.

6. In a regenerative oven, heating flues, air-heating regenerators, means for reversing the connection of the regenerators with the heating flues, and a recuperator having a path interposed between the heating flues and the regenerators, to cool the off gases before they reach the regenerators, and another path through which the fuel travels on its way to the heating flues.

7. In a regenerative oven, heating flues, air-heating regenerators having connections to the inlets of said flues and reversing means in said connections, a recuperator having an off gas path permanently connected with the outlets of the heating flues, connections from the outlet of said path to the regenerators and reversing means in said connections, said recuperator also having a separate path through which the fuel passes on its way to the heating flue inlets.

8. In a regenerative oven, heating flues, regenerators, connections for leading the off gases from the heating flues to the regenerators, reversing means interposed in said connections between the heating-flue outlets and the regenerators, and a cooling device interposed in the path of the off gases from the heating flues to the reversing means.

9. In a regenerative oven, heating flues, air-heating regenerators, means for connecting said regenerators alternately with the inlets of the heating flues, connections for leading the off gases from the outlets of the heating flues to the regenerators, reversing means interposed in said connections between the heating flue outlets and the regenerators, and a recuperator through one path of which the off gases travel on their way from the heating flues to the reversing means, the other path of the recuperator being connected with the inlets of the heating flues and adapted to convey fuel thereto.

10. In a regenerative oven, heating flues, air-heating regenerators and means for connecting them alternately with an air inlet and with a waste-gas outlet, a chest having permanent connections with the heating flue inlets and controllable connections with outlets of the regenerators, means for alternately shutting off said controllable connections, a recuperator one path of which communicates permanently with the outlets of the heating flues and the other path of which communicates permanently with the inlets of said flues and is adapted to convey fuel thereto, another chest in permanent communication with the outlet of the first-named recuperator path, controllable connections from the outlet of said second chest to inlets of the regenerators, and means for alternately shutting off said controllable connections.

In testimony whereof I have signed this specification in the presence of two subscribing witnesses.

ARTHUR GOHMANN.

Witnesses:
　GEORGE LILIEQUIST,
　EMIL SCHMIDT.